(12) United States Patent
Greberis

(10) Patent No.: US 9,765,508 B2
(45) Date of Patent: Sep. 19, 2017

(54) WASTE WATER DIFFUSER

(71) Applicant: Stan Greberis, Freehold Township, NJ (US)

(72) Inventor: Stan Greberis, Freehold Township, NJ (US)

( * ) Notice: Subject to any disclaimer, the term of this patent is extended or adjusted under 35 U.S.C. 154(b) by 0 days.

(21) Appl. No.: 15/279,413

(22) Filed: Sep. 28, 2016

(65) Prior Publication Data

US 2017/0183858 A1    Jun. 29, 2017

Related U.S. Application Data

(63) Continuation-in-part of application No. 13/726,910, filed on Dec. 26, 2012, now abandoned.

(Continued)

(51) Int. Cl.
| | |
|---|---|
| *B05B 1/14* | (2006.01) |
| *E03F 1/00* | (2006.01) |
| *C02F 1/28* | (2006.01) |
| *B01D 24/04* | (2006.01) |
| *F17D 1/08* | (2006.01) |
| *B05B 1/20* | (2006.01) |
| *B01D 21/00* | (2006.01) |
| *E03F 5/04* | (2006.01) |
| *B05B 1/04* | (2006.01) |
| *B05B 15/06* | (2006.01) |

(Continued)

(52) U.S. Cl.
CPC .......... *E03F 1/002* (2013.01); *B01D 21/0012* (2013.01); *B01D 24/042* (2013.01); *B05B 1/044* (2013.01); *B05B 1/14* (2013.01); *B05B 1/20* (2013.01); *B05B 1/207* (2013.01); *B05B 15/008* (2013.01); *B05B 15/069* (2013.01); *C02F 1/283* (2013.01); *E03F 5/0404* (2013.01); *F17D 1/08* (2013.01); *B01D 2101/02* (2013.01); *C02F 2103/42* (2013.01); *E04H 4/14* (2013.01)

(58) Field of Classification Search
CPC .. B05B 1/14; B05B 1/20; B05B 1/044; B05B 1/046; B05B 15/008; B05B 15/069; B05B 1/207; Y10S 239/23; B01D 21/0012; B01D 61/08; B01D 29/15; B01D 29/111; B01D 24/042; B01D 2101/02; E03F 5/0404; E03F 1/002; C02F 1/283; C02F 2103/42; F17D 1/08; E04H 4/14
USPC ..... 239/208, 548, 553–553.5, 550, 565–568, 239/575, 590–590.5, DIG. 23; 210/116, 210/170.03, 295, 323.2, 460
See application file for complete search history.

(56) References Cited

U.S. PATENT DOCUMENTS

| | | | |
|---|---|---|---|
| 3,401,526 A | 9/1968 | Rodgers | |
| 3,543,294 A * | 11/1970 | Boester | C02F 3/046 210/116 |

(Continued)

FOREIGN PATENT DOCUMENTS

GB    233770    1/1999

*Primary Examiner* — Steven J Ganey

(57) ABSTRACT

This application claims a system for the distribution of waste water. The invention allows water to drain from a source into the invention, where the water is distributed and diffused through a collection of outlets. Thus a large amount of water can be distributed over a large area so that the environment can more easily absorb the water and the flow of water does not cause erosion. The preferred embodiment of the invention optionally may include one or more filters to remove substances from the water before distribution.

2 Claims, 7 Drawing Sheets

Related U.S. Application Data

(60) Provisional application No. 61/584,119, filed on Jan. 6, 2012.

(51) Int. Cl.
  *B05B 15/00* (2006.01)
  *C02F 103/42* (2006.01)
  *E04H 4/14* (2006.01)

(56) References Cited

U.S. PATENT DOCUMENTS

| | | |
|---|---|---|
| 3,910,500 A | 10/1975 | Hardison |
| 4,184,789 A | 1/1980 | Gilde |
| 4,232,705 A | 11/1980 | Hait |
| 5,100,540 A | 3/1992 | Ramirez |
| 5,227,068 A | 7/1993 | Runyon |
| 5,829,916 A | 11/1998 | Evans |
| 5,897,777 A | 4/1999 | Zoeller |
| 6,056,014 A | 5/2000 | Kojima |
| 8,152,076 B2 | 4/2012 | Hewitt |
| 2003/0070985 A1 | 4/2003 | Potts |
| 2004/0112809 A1 | 6/2004 | Hassett |
| 2008/0087749 A1* | 4/2008 | Ruskin ................ A01G 25/165 239/565 |
| 2010/0206397 A1* | 8/2010 | Hewitt ................ E04D 13/0767 239/208 |

* cited by examiner

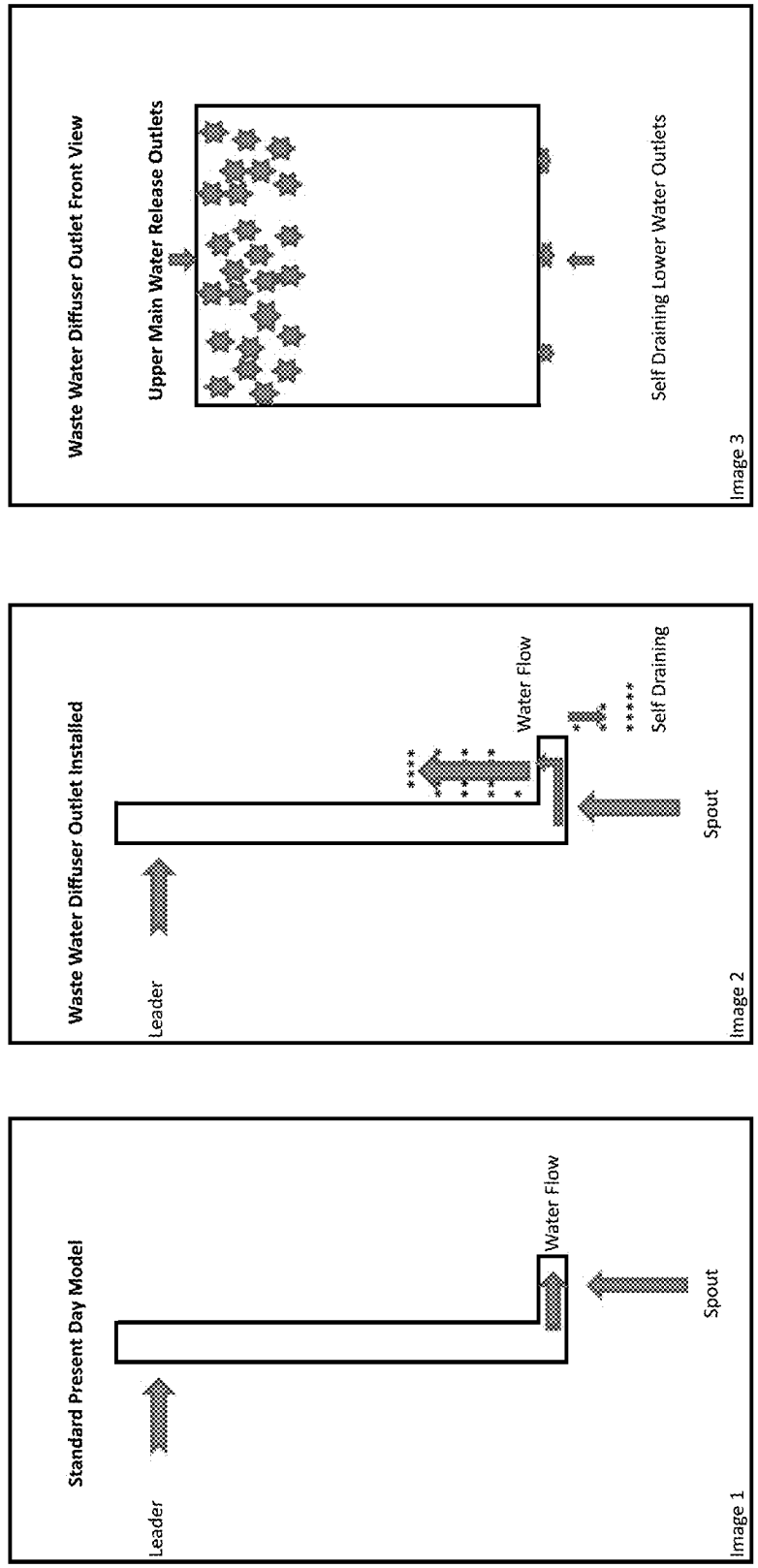

WASTE WATER DIFFUSER

PRIORITY

This continuation in part application claims the benefit of patent application Ser. No. 13/726,910 that was filed on Dec. 26, 2012, that in turn claims the benefit of provisional application, Ser. No. 61/584,119, that was filed on Jan. 6, 2012 by the inventor Stan Greberis.

BACKGROUND OF THE INVENTION

The present invention relates to methods and apparatus for handling waste water and, more particularly, to a waste water diffuser that may prevent waste water from causing soil erosion, being discharged into a public storm water systems, sanitary sewers, or waterways.

When a person faces a task of getting rid of excess, unwanted water, for example water from a basement sump or water from a pool, the water is typically carried by a hose or pipe to be released. Often, a large release of water may cause soil erosion. To avoid this type of erosion, a person may opt to disburse the water into a public storm water system down their driveway into a street drain or a sanitary sewer system. These types of releases may be harmful to the environment and are illegal in many jurisdictions. This is especially true in the case of pool water, which may contain certain chemicals.

As can be seen, there is a need for an apparatus for diffusing and distributing wastewater to avoid erosion and the delivery of wastewater into inappropriate channels. The present invention distributes wastewater quickly, yet at a slow enough rate to avoid erosion. Thus the wastewater can be discharged into a yard or field, which will absorb the water and yet not damage the yard or field. This is advantageous because erosion is avoided and water is disposed of with entering a public right of way or sewer system. Furthermore, the water can benefit local plants and the ground will act as a natural water purification system.

There is a superficial similarity between certain septic systems and certain irrigation system to the present invention. On closer inspection, the present invention is distinct from either an irrigation system or a septic system. The present invention specifically addresses the disposal of waste water from swimming pools and other containers of water that do not have a permanent waste water disposal system. The present invention is intended to be temporarily attached to a swimming pool, or other water container, and remove the water in a manner that is more convenient and more environmentally responsible that simply letting the water pour on to the ground, road, or sewer. At the same time, the present invention is only intended for use on water that can be disposed of on open ground. Water that is hazardous should not be used with the present invention.

The application by Hassett, Ser. No. 10/663,211, is a septic system that is distinct from the present invention. Hassett describes an improved septic system for disposing of sewage. As a person skilled in the art knows, sewage is both contaminated with solids and particulate matter and contaminated with biological pathogens. As Hassett describes, a functioning septic system must both remove these contaminates and disperse the wastewater into the ground in a manner that does not risk human contact. Failure of a septic system to achieve these goals is both dangerous to human health and illegal.

For this reason, the Hassett invention claims the placement of the invention into a drain field. Hassett describes as drain field as a SWIS, the SWIS (also called a leach field, drain field or infiltration trench. Hassett describes a SWIS as a soil absorption field, a soil absorption field, also known as a subsurface wastewater infiltration system. By definition, the SWIS is subsurface or below the ground. Thus the Hassett invention must be buried in order to include the drain field element.

On the other hand, the present invention is designed to be placed upon the ground and distribute water on top of the surface of the ground. In the present invention wastewater is ejected from the invention so that it flies up into the air and then falls back to earth in a manner that simulates rainfall. The purpose of this arrangement is that the wastewater is distributed over top the ground so that it does not cause erosion. It is meant to be used in situations where allowing the wastewater to exist the existing source will cause erosion because the force of the exiting water will damage the soil of the ground. The present invention reduces that force by launching the water into the air and allowing it fall back to the ground at a velocity and force that is similar or less than that of rain. As a person skilled in the art is aware that falling rain does not have enough force to cause erosion.

Furthermore, because the present invention is distributing the water in the open air, the water must be substantially free of solids, particulate matter, and pathogens before it enters the present invention. Solids and particulate matter will both clog the present invention and will reduce the pressure within the present invention to a level that will not eject the water into the air so that it can fall back to the ground to simulate rain fall. This will defeat the main advantage of this invention. And, unlike sewage, the wastewater placed within the present invention must also be substantially pathogen free, or operation of the present invention would be a danger to human health and illegal.

The Gilde patent, U.S. Pat. No. 4,184,789, is another water treatment system that is constructed into a dirt mound. The mound is created from a surface area comprising a plurality of concentric annular terraces creating a series of annular ridges and valleys in said treatment zone, a water-tolerant grass crop growing on said terraces. Water is pumped on to the terraces by a conduit adapted for movement around said treatment zone that are adapted to be capable of delivering wastewater under pressure to said conduit, and means on said conduit for distributing a substantially uniform quantity of wastewater to the grass crop on each of said terraces. The present invention is not meant to be installed in the ground or constructed from earthworks. The present invention is distinct from the mound filtration system that Gilde describes.

An example of an irrigation system that is superficially similar to the present invention is the Hait U.S. Pat. No. 4,232,705. The Hait invention is a rotary irrigation system that turns mechanically so that a power mover connected to the opposite end of some tubing to pivotally move tubing in a generally circular path around a source. The power mover is connected to a control means for intermittently actuating said power mover. The present invention is a non-mechanical means of removing wastewater. It does not rotate and is not intended to water a large field of corps. It is intended to be simple to manufacture and portable.

The Hewitt U.S. Pat. No. 8,152,076, is another irrigation system. The Hewitt invention is a device to collect and dispense roof rain water comprising a container to collect water having an opening; a pump to drive the water out of the container; a debris disposal mechanism; a sensor to measure the water level, wherein the pump is activated at a specific water level. It includes an electrical circuit to power the pump which is powered by a rechargeable battery pack; a solar panel connected to the electrical circuit to charge the rechargeable battery pack; a heating device to keep the water within the container from freezing. This invention collects water in a container and then stores it for distribution, even in freezing weather. The present invention is a means for the distribution, not a means of storage.

The Runyon invention, U.S. Pat. No. 5,227,068, is another irrigation system. It is an apparatus for providing improved microbiotic and nutrient supplies to vegetation in a non-sterilized environment; which comprises vessels containing water slurries of an oxygen-generating first microorganism, a soil enhancing second microorganism, and enzymes and nutrients for the first and second microorganisms. It has a first conduit to convey supply water and said slurries into said at least one enhancement vessel and a second conduit means to convey the combined discharge slurry containing said concentrated first and second microorganisms from said enhancement vessel to said vegetation. The present invention only disposes of water. It does not add material to the water nor does it supply nutrients to plants.

The Hardison U.S. Pat. No. 2,910,500, is for a drip irrigation system. The Hardison invention, like all drip irrigation systems, envisions a branching set of tubes that distribute water to each plant individually. The present invention is a compact object that does not branch or divide. Furthermore, unlike a drip irrigation system that allows water to slowly dissipate, the present invention can accommodate many different levels of flow and is intended to distribute water reasonably quickly.

BRIEF DESCRIPTION OF THE DRAWINGS

FIG. 8 is a detailed view of the flow of water through the water distribution system.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a water distribution system that may discharge wastewater into the surrounding soil without creating soil erosion. The water distribution system may create a fountain-like or sprinkler-like distribution of wastewater over a substantial ground surface area, permitting the water to soak into the soil rather than run over the top of the soil, which leads to erosion.

Figure 1:
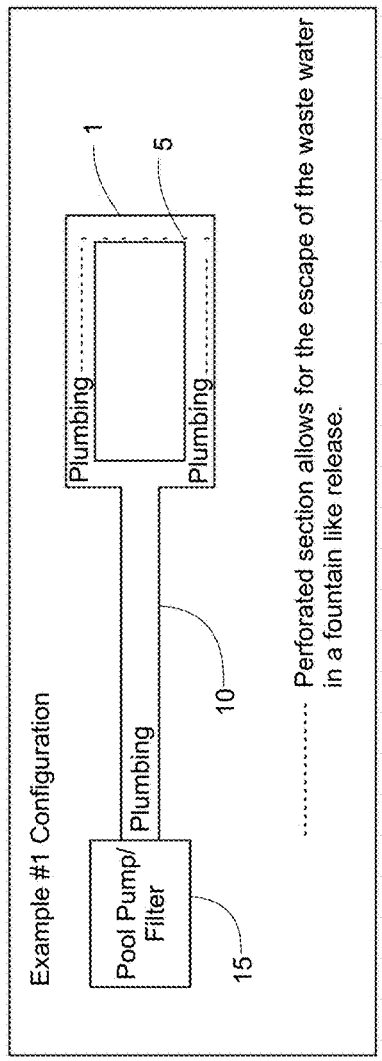
FIG. 1 is a schematic view of a water distribution system according to an exemplary embodiment of the present invention.

Referring to FIG. 1, a water distribution system may be a fountain-type system where tubing may carry water from a source to a series of perforations in the pipe that distribute the water from the tubing in a fountain-like distribution. An example of a source, intended as an example and not has a limitation, is a pool water pump. The perforations may be distributed along the tubing such that there is little or no overlap from the spray from one of the perforations to the spray of an adjacent perforation.

Figure 2:
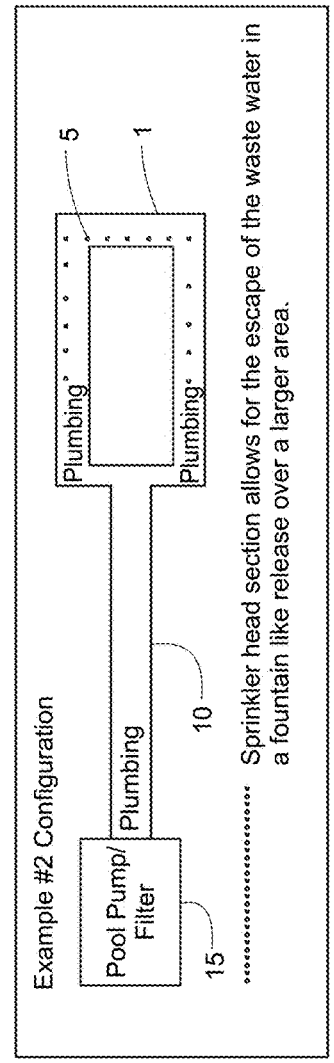
FIG. 2 is a schematic view of the water distribution system according to another exemplary embodiment of the present invention.

Referring to FIGS. 1 and 2, the water distribution system comprises a pool pump or filter 15 connected to a supply tube 10. The supply tube 10 is connected to a distribution tube 1. On the distribution tube 1 is a plurality of distribution openings 5. FIG. 1 shows the distribution openings 5 as holes. FIG. 2 shows the distribution openings 5 as sprinklers.

Figure 3:
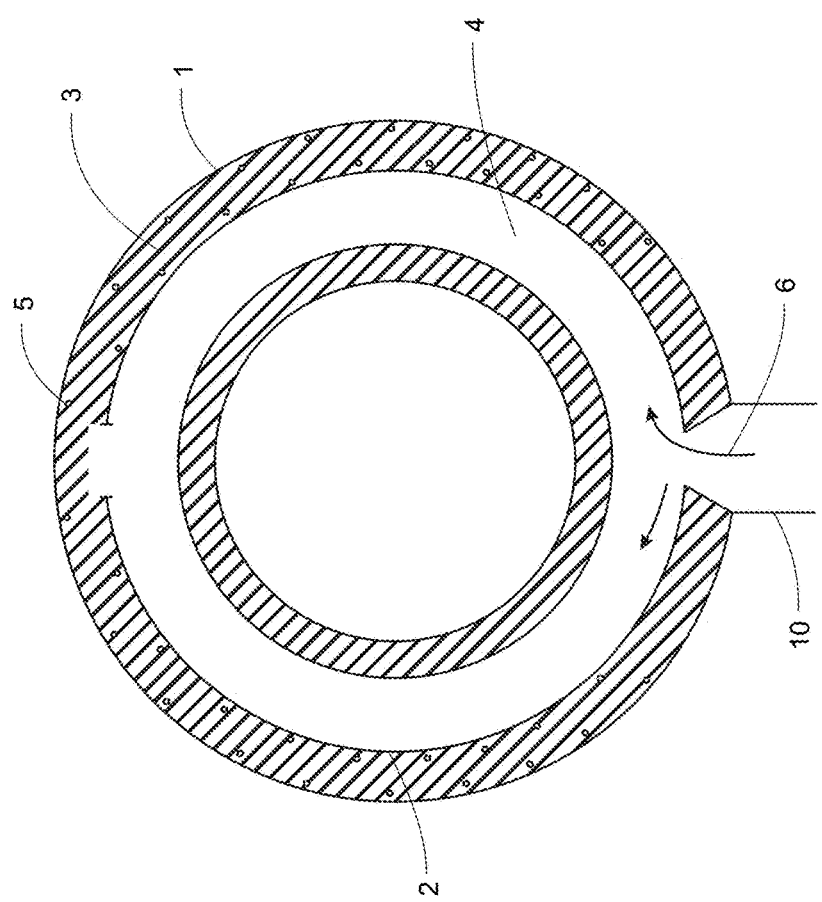
FIG. 3 is a detailed view of the interior of the water distribution system.

Referring to FIG. 3, FIG. 3 shows a top view of the water distribution system with supply tube 10 connected to and entering distribution tube 1. Supply tube 10 is then inside the distribution lumen 3 of the distribution tube 1, forming inner tube 2 that is substantially parallel to the distribution tube. The distribution tube 1 also has distribution openings 5. The water 6 travels in the supply lumen 4 of the supply tube 10, through inner tube 2, then into the distribution lumen 3 of the distribution tube 1. The water 6 is then distributed out of the system by the distribution openings 5.

Figure 4:
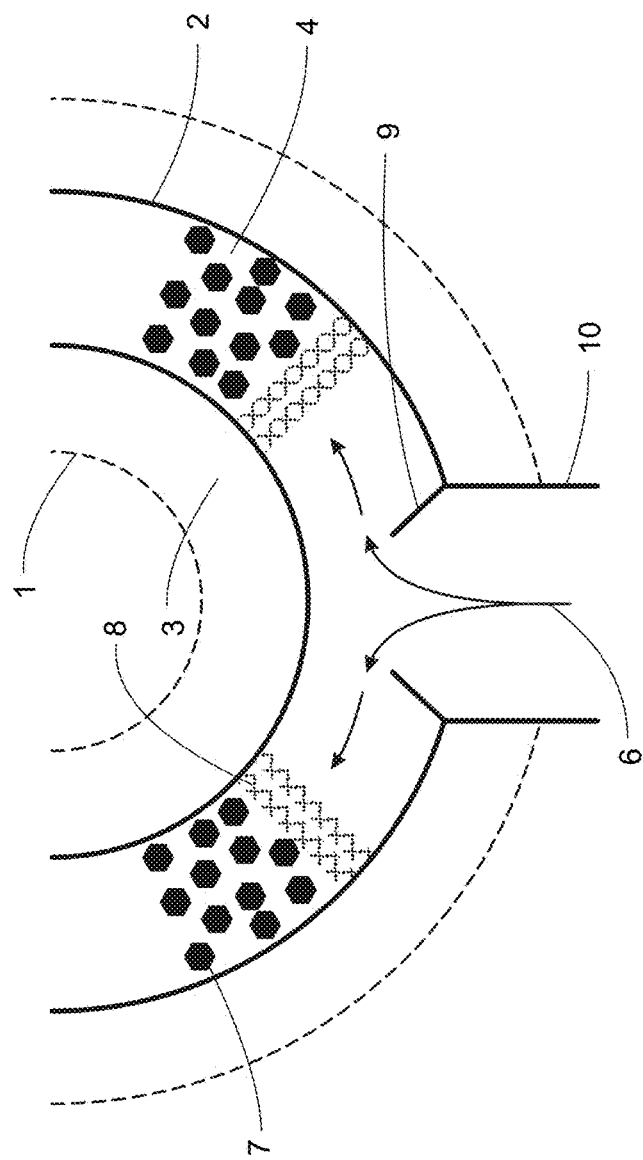
FIG. 4 is another detailed view of the interior of the water distribution system.

Referring to FIG. 4, FIG. 4 is a detailed drawing of the junction between the supply tube 10 and the distribution tube 1. At the point where supply tube 10 meets distribution tube 1, the two tubes are joined and reinforced by a collar or funnel 9. The funnel 9 creates an opening into the inner tube 2, which is itself an extension of the supply tube 10. The inner tube 2 contains a filter 7 in the supply lumen of the supply tube 10 in the part of the supply tube 10 that is also the inner tube 2. In the preferred embodiment, the filter 7 comprises carbon particles. These filter 7 particles are held in place by a mesh 8. Thus the water 6 can flow from the supply tube 10, past the funnel 9, into the inner tube 2, which is in turn in the distribution lumen 3 of the distribution tube 1.

Figure 5:
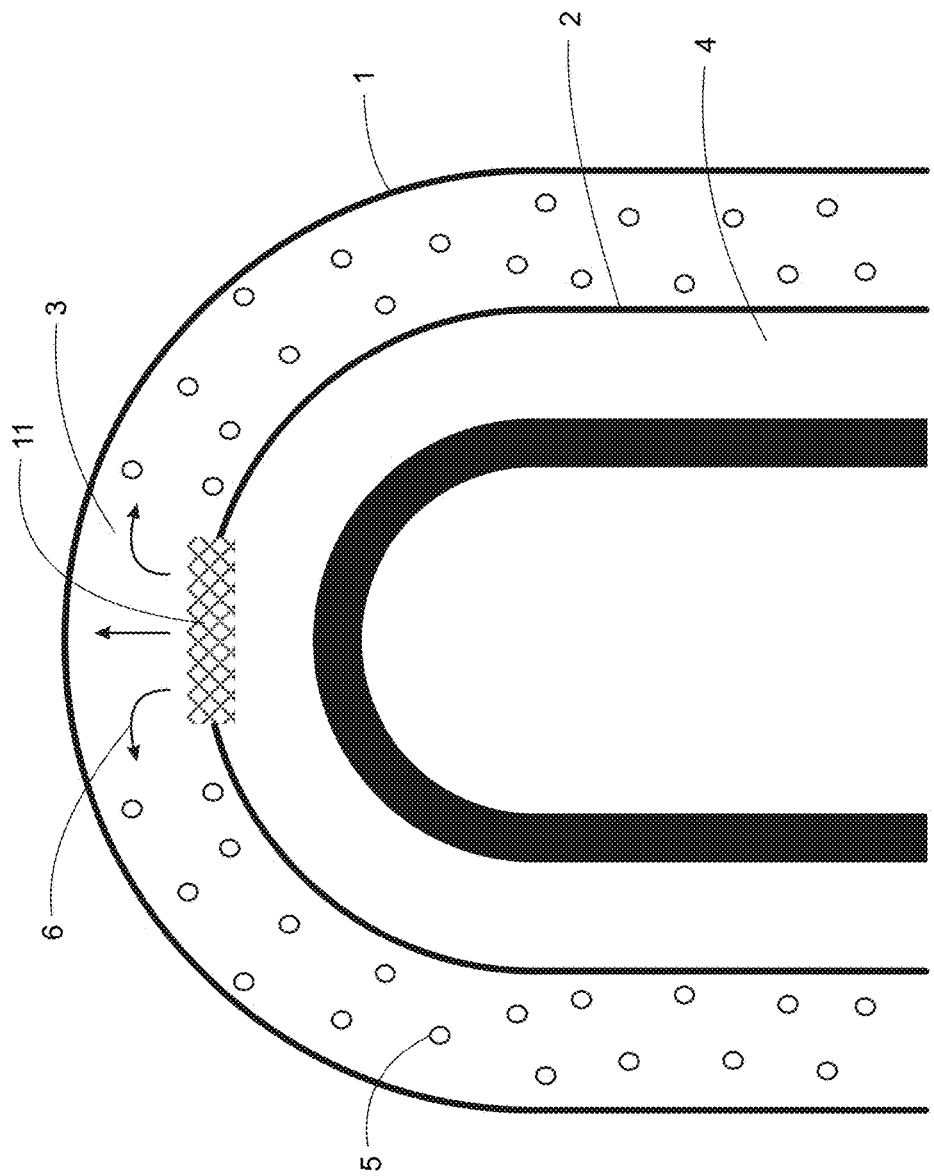
FIG. 5 is another detailed view of the interior of the water distribution system.

Referring to FIG. 5, FIG. 5 is a detailed drawing of the outlet 11 between the inner tube 2 and the distribution tube 1. Distribution tube 1 has distribution openings 5. Water 6 travels through supply lumen 4 and crosses outlet 11 to enter distribution lumen 3 and then exit distribution tube 1 through distribution openings 5.

Figure 6:
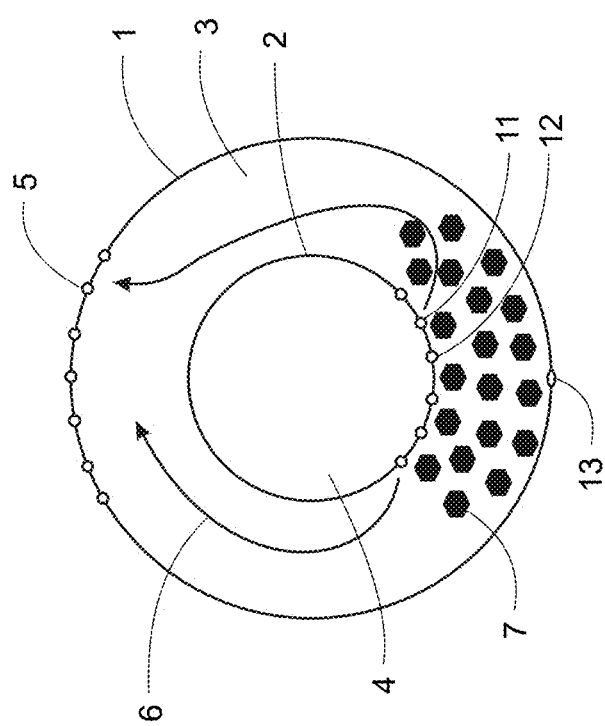
FIG. 6 is another detailed view of the interior of the water distribution system.

Referring to FIG. 6, FIG. 6 is a cross section of the water distribution system. Distribution tube 1 has distribution lumen 3 and distribution opening 5. Within the distribution lumen 3 is inner tube 2. Inner tube 2 contains supply lumen 4, which is a continuation of the supply tube 10, not pictured. Inner tube 2 has outlet 11. Outlet 11 comprises a plurality of outlet openings 12. Filter 7 is located in distribution lumen 3. Distribution tube 1 also has a drain 13. In this version, the position of outlet 11 and filter 7 is at the bottom of distribution lumen 3, so that water 6 must travel down through outlet 11 and filter 7 and then up to distribution openings 5.

Figure 7:
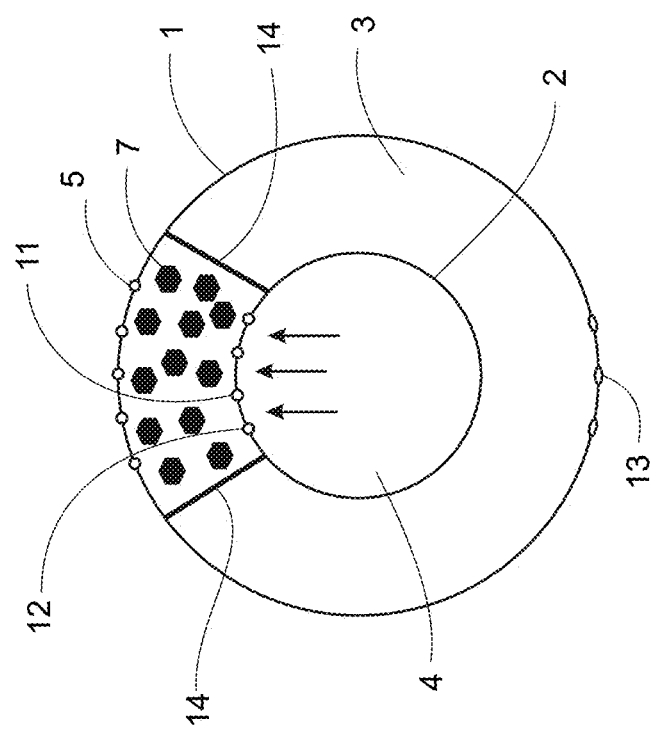
FIG. 7 is another detailed view of the interior of the water distribution system.

Referring to FIG. 7, FIG. 7 is a cross section of the water distribution system. Distribution tube 1 has distribution lumen 3 and distribution opening 5. Within the distribution lumen 3 is inner tube 2. Inner tube 2 contains supply lumen 4, which is a continuation of the supply tube 10, not pictured. Inner tube 2 has outlet 11. Outlet 11 comprises a plurality of outlet openings 12. Filter 7 is located in distribution lumen 3. Filter 7 is held in place by flanges 14. Distribution tube 1 also has a drain 13. In this version, the position of outlet 11 and filter 7 is at the top of distribution lumen 3, so that water 6 must travel up through outlet 11 and filter 7 and then up to distribution openings 5.

Referring to FIG. 8, FIG. 8 is a detailed view of the flow of water through the water distribution system. FIG. 8 compares the present invention to a hypothetical standard arrangement and shows the flow of water through each system. Image 2 and 3 of the FIG. 8 show a side and front view of the flow of water through the water distribution system.

While FIG. 1 shows a rectangular distribution area, the tubing may be arranged in any number of patterns. The size of the perforations may be determined through a variety of factors, such as the type of soil, the amount of water typically distributed through the system on a single time, the pressure of the water within the tubing during the distribution process, and the like. Typically, the number of perforations and the size thereof will be adequate to distribute/diffuse the wastewater while permitting the water to be absorbed into the soil, without causing soil erosion. In the preferred embodiment, the distribution tube will be circular in shape. The circular shape is preferable because it promotes even distribution of the water, and is ascetically pleasing. Other embodiments are also functional and may be advantageous in cases where the desired distribution of water is uneven. Other embodiments of the water distribution system can also be a be a three-dimensional shape, such as a box, pyramid, ball or any other shape that will capture the water and then allow for the escape through the upper and side perforations and/or attachments, such as sprinkler heads, while including a modest amount of perforations on the bottom to allow the unit to self drain. Each of these three-dimensional versions can have a modified bottom so that the water distribution system can be placed stability on a surface, such as making the bottom of a ball flat.

The tubing may be typical plumbing tubing and may include PVC, metal, or other materials. For example, the tubing leading from the wastewater source (such as a pool), may be collapsible flexible drain tubing, permitting easy storage thereof. The distribution portion of the tubing may be the same or different material as the tubing connecting the water source (pool) to the distribution portion. In some embodiments, the distribution portion may be rigid tubing, which may ensure alignment of the perforations, or distribution openings 5, perpendicular to the ground.

Referring to FIG. 2, in place of the distribution opening 5, sprinkler heads may be fluidly connected to the distribution tube 1 to permit the wastewater 6 to be distributed over a larger surface area.

In some embodiments, the system of the present invention may be supplied as a kit. The kit may include tubing to connect the distribution system to the pump and distribution tubing having a water distributing means, such as perforations or sprinkler heads, as described above. The kit may supply the distribution tubing in various pieces and may include a variety of connectors so that a user may create their own pattern for water distribution. For example, the kit may include various pieces of perforated pipe along with elbows, tees, and the like. The fittings may be quick release fittings, permitting the user to quickly assemble and disassembly the system of the present invention.

The filter 7 may be made of any filtering material, including foams, mesh, ceramics, and absorbent particles. In the preferred embodiment, the filter 7 is made of carbon particles that are larger than any exit to the inner tube 2. In some cases the carbon particles will be held into place by a mesh 8 or a flange 14.

In some embodiments, the distribution tube 1 has one or more drains 13. The drains 13 are placed on the bottom portion of the distribution tube 1. The purpose of the drains 13 is to drain any water trapped or remaining in the distribution tube 1 so that the distribution tube 1 is dry for storage. Furthermore, standing water is a known vector for insect larvae growth. The drains, 13 will allow the operator to drain the distribution tube 1 to reduce the growth of insect larvae.

In some embodiments, the filter 7 is external to the distribution tube 1. In this case, the filter 7 is placed before or within supply tube 10 and before the junction between supply tube 10 and distribution tube 1. In other embodiments, the filter 7 is not included in the apparatus. In this embodiment, the water 6 will pass through the distribution tube 1 and inner tube 2 without being filtered.

The preferred embodiment envisions the use of the wastewater drainage system to distribute unneeded pool water. The wastewater drainage system can also be used to drain rain and other runoff water. The wastewater drainage system can be attached to a sink, tube, or tank drain. The wastewater drainage system can be attached to a gutter or downspout. The system can be used in landscaping and construction site applications.

The invention envisions use with water that is substantially free of solids and particulate matter. In the preferred embodiment, the wastewater will be substantially free of solids and particulate matter, such as pool water or rainwater. Alternatively, the wastewater will have solids and particulate matter removed from the water before the water is delivered to the supply tube 10. In addition, the wastewater is envisioned as being substantially free of pathogens and dangerous chemicals before the wastewater is delivered to the supply tube 10.

The purpose of the invention is to distribute wastewater over an area with out inducing erosion of the surface of the area. The preferred use of the invention is as a means to dispose of waste water from a common source, such as a swimming pool, pond or rain gutter by distributing the waste water in the air so that is spread over an area of ground and absorbed by the ground without causing erosion of the soil or sand that comprises the ground. As an example and not meant as a limitation in any way, the invention could be used to drain the water from a swimming pool into a garden when the pool is being drained for winter.

In order for the invention to distribute the waste water, but avoid causing erosion, the water must be ejected from the invention with enough force to distribute the water over a reasonably wide area, but gently enough so that when it hits the ground, the ground does not suffer from erosion. This is achieved by sending the waste water into the supply tube 10 at a sufficient amount of pressure. This pressure can be generated with a mechanical pump or by placing the invention at a lower altitude than the source of the wastewater and using the potential energy of gravity to general pressure in the water.

The water is then ejected from the distribution tube 1 at a pressure that relates to the pressure of the water as it entered the supply tube 10. The ejection pressure must be sufficient to propel the water against the direction of gravity into the air so that it will scatter over an area similar to or larger than the area covered by the invention. The water will rise to a height determined by the ejection pressure so that the greater the ejection pressure, the higher the water will travel into the air. In the preferred embodiment, the water will travel three to ten feet into the air.

The water will create a parabola as it travels through the air. It will stop traveling upward at the vertex of the parabola and begin to descend at the normal acceleration of gravity. This will allow the water to be introduced to the supply tube 10 at a certain pressure, but to land on the surface around the invention at the same velocity regardless of the initial pressure. This will insure that velocity is low enough that it will not cause erosion when the water strikes the surface. In effect, the water will strike the surface at a level of force that is similar to or less than the force of a raindrop. Since force is acceleration time mass, the acceleration of the waste water once it begins to descend from the vertex of the parabola will the acceleration of gravity, which is the same acceleration as a rain drop. Furthermore, the scattering effect of the ejection of the water from the distribution tube 1 will result in the formation of small spheres of water that are approximately the same mass as a rain drop. Since both the acceleration and the mass of the water will be similar to that of rain, the water will behave like rain when it strikes the surface around the invention. Since rain does not erode soil or sand, neither will the invention.

It should be understood, of course, that the foregoing relates to exemplary embodiments of the invention and that modifications may be made without departing from the spirit and scope of the invention as set forth in the following claims.

What is claimed is:

1. A water distribution system comprising:

waste water that is provided by a source and is substantially free of particulate matter and is provided from the source at a certain pressure;

an assembly comprising a supply tube and a distribution tube;

the supply tube for carrying the waste water from the source to the distribution tube;

one or more of distribution outlets in the distribution tube, the distribution outlets adapted to distribute the wastewater over a surface;

the supply tube integrates into the distribution tube and includes an outlet on the supply tube that allows water within the supply tube to leave the supply tube and enter the distribution tube;

the outlet comprises one or more openings that are sized to prevent back flow of water;

so that the waste water enters the supply tube at the certain pressure and is distributed to the distribution tube and released by the distribution tube so that the waste water is distributed over a surface at a pressure that is within the range of having sufficient force to propel the waste water a vertical distance from the distribution system and lacking sufficient force to induce erosion of soil when the waste water lands on the surface.

2. A water distribution system comprising:

waste water that is provided by a source and is substantially free of particulate matter and is provided from the source at a certain pressure;

an assembly comprising a supply tube and a distribution tube;

the supply tube for carrying the waste water from the source to the distribution tube;

wherein the supply tube extends within the lumen of the distribution tube so that the supply tube and the distribution tube are substantially parallel;

and the supply tube has an outlet with one or more openings that allows water to move from the supply tube to the inside of the distribution tube without back flow of the water into the supply tube;

and the distribution tube has one or more distribution outlets;

and the distribution outlets adapted to distribute the wastewater over a surface, the surface comprising a mixture of soil, sand, or soil and sand;

so that water may enter the water distribution system by the supply tube, then enter the distribution tube and leave the distribution tube by the distribution outlets so that the water is distributed and dispersed over an relatively large area;

so that the waste water enters the supply tube at the certain pressure and is distributed to the distribution tube and released by the distribution to so that the waste water is distributed over a surface at a pressure that is within the range of having sufficient force to propel the waste water a distance into the air and away from the distribution system so that the waste water forms a parabola and descends towards the surface at a level of force that is substantially similar or less than the force of a rain drop so that the waste water will not induce erosion of soil and sand when the waste water lands on the surface.

* * * * *